United States Patent
Goto et al.

(10) Patent No.: US 9,493,857 B2
(45) Date of Patent: Nov. 15, 2016

(54) VALUABLE-METAL EXTRACTION METHOD

(71) Applicants: Kyushu University, National University Corporation, Fukuoka-shi (JP); SUMITOMO METAL MINING CO., LTD., Tokyo (JP)

(72) Inventors: Masahiro Goto, Fukuoka (JP); Fukiko Kubota, Fukuoka (JP); Yuzo Baba, Fukuoka (JP)

(73) Assignees: Kyushu University, National University Corporation, Fukuoka-shi (JP); SUMITOMO METAL MINING CO., LTD., Tokyo (JP)

( * ) Notice: Subject to any disclaimer, the term of this patent is extended or adjusted under 35 U.S.C. 154(b) by 0 days.

(21) Appl. No.: 14/765,272

(22) PCT Filed: Mar. 12, 2014

(86) PCT No.: PCT/JP2014/056557
§ 371 (c)(1),
(2) Date: Jul. 31, 2015

(87) PCT Pub. No.: WO2014/148339
PCT Pub. Date: Sep. 25, 2014

(65) Prior Publication Data
US 2015/0376734 A1    Dec. 31, 2015

(30) Foreign Application Priority Data

Mar. 18, 2013 (JP) .................................. 2013-054878

(51) Int. Cl.
*C22B 3/00* (2006.01)
*C22B 13/00* (2006.01)
(Continued)

(52) U.S. Cl.
CPC .......... *C22B 3/0004* (2013.01); *C22B 3/0005* (2013.01); *C22B 13/04* (2013.01);
(Continued)

(58) Field of Classification Search
CPC ... C22B 3/0004; C22B 3/0005; C22B 13/04; C22B 15/0063; C22B 15/0089
See application file for complete search history.

(56) References Cited

U.S. PATENT DOCUMENTS

| 6,267,936 | B1 | 7/2001 | Delmas et al. |
| 8,951,486 | B2 * | 2/2015 | Goto ..................... C22B 3/0005 |
| | | | 423/21.1 |
| 9,011,804 | B2 * | 4/2015 | Goto ..................... C22B 3/0005 |
| | | | 423/150.1 |

FOREIGN PATENT DOCUMENTS

| AU | 725800 B2 | 10/2000 |
| EP | 2679693 A1 | 1/2014 |

(Continued)

OTHER PUBLICATIONS

International Search Report dated Apr. 22, 2014 for PCT/UP2014/056557.

(Continued)

*Primary Examiner* — George Wyszomierski
*Assistant Examiner* — Tima M McGuthry Banks
(74) *Attorney, Agent, or Firm* — Locke Lord LLP; James E. Armstrong, IV; Nicholas J. DiCeglie, Jr.

(57) ABSTRACT

In order to selectively extract copper and/or lead from an acidic solution containing high concentrations of manganese, etc., the valuable-metal extracting agent of the present invention is expressed by general formula (1). In the formula, $R^1$ and $R^2$ each represent the same or different alkyl groups, $R^3$ represents a hydrogen atom or an alkyl group, and $R^4$ represents a hydrogen atom or a given group, other than an amino group, that bonds with an α carbon as an amino acid. In general formula (1), the inclusion of a glycine unit, a histidine unit, a lysine unit, an asparagine acid unit, or a normal methylglycine unit is preferred. When using the extracting agent to extract copper/and lead, it is preferable that the pH of the acidic solution be adjusted to 1.0-5.5 inclusive.

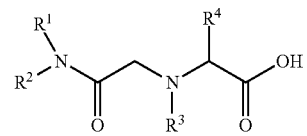

12 Claims, 3 Drawing Sheets

(51) Int. Cl.
  *C22B 15/00* (2006.01)
  *C22B 3/20* (2006.01)
  *C22B 3/26* (2006.01)
(52) U.S. Cl.
  CPC ....... *C22B15/0063* (2013.01); *C22B 15/0089* (2013.01); *Y02P 10/234* (2015.11); *Y02P 10/236* (2015.11); *Y02W 30/84* (2015.05)

(56) References Cited

FOREIGN PATENT DOCUMENTS

| JP | 2000234130 A | 8/2000 |
| JP | 2013-202460 A | 10/2013 |

OTHER PUBLICATIONS

Hirofumi Morizono et al., Liquid-liquid extraction of transition metal ions with an alkylhistidine extractant, Separation and Purification Technology, Jul. 29, 2011, vol. 80 No. 2, p. 390-395.
Holger Stephan et al: "Liquid-Liquid Extraction of Metal Ions With Amido Podands", Solvent Extraction and Ion Exchange, Taylor & Francis Group LLC, US, vol. 9, No. 3, Jan. 1, 1991, pp. 459-469.
Extended European Search Report dated Feb. 16, 2016, issued for European Patent Application No. 14767441.0.
K. Shimojo, H. Naganawa, J. Noro, F. Kubota and M. Goto; Extraction behavior and separation of lanthanides with a diglycol amic acid derivative and a nitrogen-donor ligand; Anal. Sci., 23, 1427-30, Dec. 2007.

* cited by examiner

Relationship between pH and extraction rates when extraction agent of example is used

VALUABLE-METAL EXTRACTION METHOD

CROSS-REFERENCE TO RELATED APPLICATIONS

This application is the national phase under 35 U.S.C. §371 of PCT International Application No. PCT/JP2014-056557, filed Mar. 12, 2014, which claims the benefit of Japanese Application No. 2013-054878, filed Mar. 18, 2013, the entire contents of the aforementioned applications are hereby incorporated herein by reference.

TECHNICAL FIELD

The present invention relates to a method of extracting metal, particularly copper and/or lead.

BACKGROUND ART

Copper, nickel, and cobalt are known as valuable metals and used for various applications in industry. Nickel and cobalt are used, for example, for positive electrode materials for secondary batteries. Copper is widely used in electronic materials. Copper serves, for example, as a conductor in electric wires and electronic substrates and as a wiring material within batteries.

In recent years, energy conservation has been strongly promoted, and in the automobile industry, conventional gasoline-engined cars are being rapidly replaced by hybrid cars and electric cars both equipped with secondary batteries using nickel, cobalt, and the like. Nickel and cobalt are scarce resources and most of them depend on imports.

Products which have rapidly spread, such as secondary batteries, can be also easily expected to cause a large amount of waste in the future as used products. Thus, copper, nickel, and cobalt, scarce resources, are treated as waste without recycling of the used products, which is not preferred in terms of resource savings and resource security. Nowadays, the establishment of a method for effectively retrieving valuable metals such as nickel, cobalt, and rare earth metals from such used products is strongly demanded.

The secondary batteries mentioned above include nickel metal hydride batteries and lithium-ion batteries. The positive electrode materials thereof contain manganese as well as nickel and cobalt, which are rare metals. Copper is also used as a constituent of the batteries. In positive electrode materials in the lithium-ion batteries, the content of expensive cobalt is being reduced and the content of less expensive manganese is being increased. Attempts have been recently made to retrieve valuable metals from used batteries, and one of the methods of retrieval is a dry process where used batteries are melted in a furnace and then metal is separated from slag and retrieved. In this process, however, manganese moves into the slag and therefore the only components that are successfully retrieved are copper, nickel, and cobalt.

Also known is a wet process where used batteries are melted in acid and then metal is retrieved by a separation method such as precipitation, solvent extraction, and electrowinning. As a method of precipitation, processes are known where pH adjustment of a solution containing nickel and/or cobalt and manganese is followed by addition of a sulphiding agent to obtain a precipitate of sulphide of nickel and/or cobalt or followed by addition of an oxidizing agent to obtain a precipitate of oxide of manganese (see Patent Document 1). When such a solution also contains copper and/or lead as in the case where waste batteries and other waste electronic components are subjected to acid leaching all at once, the precipitation method described above can be employed to precipitate copper and/or lead as a precipitate of sulphide thereof before nickel and/or cobalt precipitates as a sulphide thereof so as to separate copper and/or lead from nickel and/or cobalt for retrieval. However, the method described in Patent Document 1 has disadvantages such as occurrence of coprecipitation, and therefore it is difficult to completely separate nickel, cobalt, and manganese from each other. The method described in Patent Document 1 has another problem that a small amount of copper, if any, coexisting with nickel and/or cobalt in the sulphide precipitate reduces the purity of the sulphide to make it difficult to perform reuse thereof as battery materials or the like and, as a result, to increase re-refining costs.

As for the case where electrowinning is employed to retrieve nickel as metal, it is known that oxide of manganese, if contained at a high concentration in the system employed, becomes deposited on the anode surface to accelerate anode degradation. Furthermore, in electrowinning, colored fine oxide of manganese typically floats in the electrolyte solution to clog a filter cloth used in electrowinning, to cause contamination of the metal nickel with the oxide of manganese, or to cause another problem, and, as a result, consistent operation becomes difficult to carry out.

In solvent extraction for nickel retrieval, acid-based extraction agents are widely used. However, as described above, manganese is used at a high proportion in positive electrode materials in recent lithium-ion batteries and, accordingly, the melt of the batteries contains manganese at a high concentration. At present, there is no effective extraction agent capable of selectively and effectively extracting nickel from such a system.

Patent Document 1: Japanese Unexamined Patent Application, Publication No. 2000-234130

Non-Patent Document 1: K. Shimojo, H. Naganawa, J. Noro, F. Kubota and M. Goto; Extraction behavior and separation of lanthanides with a diglycol amic acid derivative and a nitrogen-donor ligand; Anal. Sci., 23, 1427-30, 2007 Dec.

DISCLOSURE OF THE INVENTION

Problems to be Solved by the Invention

An object of the present invention is to provide a method of selectively extracting copper and/or lead from an acid solution that also contains manganese and the like at a high concentration.

As a result of repeated intensive investigation to solve the above problem, the present inventors found that the above object could be achieved by providing a valuable metal extraction agent comprising an amide derivative represented by the following general formula (I), thereby completing the present invention.

Means for Solving the Problems

Specifically, the present invention provides as follows.

(1) The present invention is a valuable metal extraction method, the method including subjecting an acid solution containing copper and/or lead and manganese to solvent extraction with a valuable metal extraction agent that contains an amide derivative represented by the following general formula (I):

(in which, $R^1$ and $R^2$ each represent the same or different alkyl groups; the alkyl group can be a straight chain or a branched chain; $R^3$ represents a hydrogen atom or an alkyl group; and $R^4$ represents a hydrogen atom or any group other than an amino group, which is bound to the α carbon as an amino acid) to extract the copper and/or the lead from the acid solution.

(2) The present invention is also the valuable metal extraction method according to (1), in which the amide derivative is any one or more of glycinamide derivatives, histidinamide derivatives, lysinamide derivatives, aspartamide derivatives, and N-methylglycine derivatives.

3) The present invention is also the valuable metal extraction method according to (1) or (2), in which the acid solution is subjected to the solvent extraction with the pH of the acid solution adjusted to 1.0 or higher.

(4) The present invention is also the valuable metal extraction method according to (3), in which the acid solution is subjected to the solvent extraction with the pH of the acid solution adjusted to a range of 5.5 or lower.

(5) The present invention is also the valuable metal extraction method according to (1) or (2), in which the acid solution contains copper, lead, and cobalt, the acid solution is subjected to the solvent extraction with the pH of the acid solution adjusted to a range of 3.5 or higher to 5.5 or lower to extract the copper and the lead from the acid solution, and subsequently the acid solution is subjected to the solvent extraction with the pH of the acid solution adjusted to a range of 1.0 or higher to 3.5 or lower to extract the copper from the acid solution.

(6) The present invention is also a valuable metal extraction method, the method including subjecting an acid solution containing copper and nickel to solvent extraction with a valuable metal extraction agent that contains an amide derivative represented by the general formula (I) above to extract the copper from the acid solution.

(7) The present invention is also the valuable metal extraction method according to (6), in which the acid solution is subjected to the solvent extraction with the pH of the acid solution adjusted to a range of 1.0 or higher to 2.5 or lower.

(8) The present invention is also a valuable metal extraction method, the method including subjecting an acid solution containing copper and/or lead and cobalt to solvent extraction with a valuable metal extraction agent that contains an amide derivative represented by the general formula (I) above to extract the copper and/or the lead from the acid solution.

(9) The present invention is also the valuable metal extraction method according to (8), in which the acid solution contains copper and cobalt, and the acid solution is subjected to the solvent extraction with the pH of the acid solution adjusted to a range of 1.0 or higher to 3.5 or lower.

(10) The present invention is also the valuable metal extraction method according to (8), in which the acid solution contains lead and cobalt, and the acid solution is subjected to the solvent extraction with the pH of the acid solution adjusted to a range of 1.0 or higher to 3.3 or lower.

Effects of the Invention

According to the present invention, copper and/or lead can be selectively extracted from an acid solution that also contains manganese at a high concentration. Also according to the present invention, copper can be selectively extracted from an acid solution containing copper and nickel. Furthermore according to the present invention, copper and/or lead can be selectively extracted from an acid solution containing copper and/or lead and cobalt.

PREFERRED MODE FOR CARRYING OUT THE INVENTION

The specific embodiments of the present invention will now be described in detail. It should be noted, however, that the present invention is not restricted to the following embodiments and can be carried out with proper modification within the scope of the object of the invention.

Valuable Metal Extraction Method

In a nickel extraction method of the present invention, solvent extraction with a valuable metal extraction agent that contains an amide derivative represented by the following general formula (I) is performed, and copper and/or lead is extracted from at least an acid solution containing copper and/or lead and manganese, an acid solution containing copper and nickel, or an acid solution containing copper and/or lead and cobalt.

In the formula, $R^1$ and $R^2$ each represent the same or different alkyl groups. The alkyl group can be a straight chain or a branched chain. $R^3$ represents a hydrogen atom or an alkyl group. $R^4$ represents a hydrogen atom or any group other than an amino group, which is bound to the α carbon as an amino acid. In the present invention, lipophilicity is increased by introducing alkyl groups into the amide skeleton, and the compound can be used as an extraction agent.

The above amide derivative is any one or more of glycinamide derivatives, histidinamide derivatives, lysinamide derivatives, aspartamide derivatives, and N-methylglycine derivatives. When the amide derivative is a glycinamide derivative, the above glycinamide derivative can be synthesized by the following method. First, a 2-halogenated acetyl halide is added to an alkylamine having a structure represented by NHR$^1$R$^2$ (R$^1$ and R$^2$ are the same as the above substituents R$^1$ and R$^2$), and the hydrogen atom of amine is substituted with a 2-halogenated acetyl by the nucleophillic substitution reaction to obtain a 2-halogenated (N,N-di)alkylacetamide.

Next, the above 2-halogenated (N,N-di)alkylacetamide is added to glycine or an N-alkylglycine derivative, and one of the hydrogen atoms of the glycine or N-alkylglycine derivative is substituted with an (N,N-di)alkylacetamide group by the nucleophillic substitution reaction. A glycine alkylamide derivative can be synthesized by the two-step reactions.

A histidinamide derivative, a lysinamide derivative or an aspartamide derivative can be synthesized by substituting glycine with histidine, lysine or aspartic acid. The extraction behavior of lysine and aspartic acid derivatives is, however, thought to be within the range of the results obtained by using a glycine derivative and a histidinamide derivative according to the complex stability constant of manganese, cobalt and the like, which are targets.

To extract valuable metal ions using an extraction agent synthesized by the above method, with an acid aqueous solution comprising the objective valuable metal ions being adjusted, the acid aqueous solution is added to an organic solution of the above extraction agent, and mixed. Therefore, the objective valuable metal ions can be selectively extracted in the organic phase.

The organic solvent after extraction of the valuable metal ions is collected, and to this, a starting solution for back extraction is added and stirred to separate the objective valuable metal ions by extraction to an organic solvent, with the starting solution adjusted to a pH lower than that of the above acid aqueous solution. The objective valuable metal ions can be further retrieved from the organic solvent in an aqueous solution by back extraction of the objective valuable metal ions. As a solution for back extraction, for example, an aqueous solution in which nitric acid, hydrochloric acid or sulfuric acid is diluted is suitably used. In addition, the objective valuable metal ions can be concentrated by suitably changing the ratio of the organic phase and the aqueous phase.

Any organic solvent can be used, as long as an extraction agent and the extracted species of metals are dissolved with the solvent, and examples thereof include chlorine-based solvents such as chloroform and dichloromethane, aromatic hydrocarbons such as benzene, toluene and xylene, aliphatic hydrocarbons such as hexane, and the like. These organic solvents can be used individually, or two or more organic solvents can be mixed, and alcohols such as 1-octanol can be mixed therewith.

The concentration of the extraction agent can be properly set depending on the types and concentrations of valuable metals. In addition, the equilibrium arrival time varies depending on the types and concentrations of valuable metals and the amounts of extraction agent to be added, and thus the stirring time and extraction temperature can be suitably set depending on the conditions of an acid aqueous solution of valuable metal ions and an organic solution of the extraction agent. The pH of an acid aqueous solution comprising metal ions can be also suitably adjusted depending on the types of valuable metal.

Case Where Acid Solution is Acid Solution Containing Copper and/or Lead and Manganese When the acid solution is the acid solution containing copper and/or lead and manganese, in order to efficiently retrieve copper and/or lead from the acid solution, any of the amide derivatives above may be used as an extraction agent. As for pH, addition of an organic solution of the extraction agent is preferably performed with the pH of the acid solution adjusted to 1.0 or higher. In order to increase the amount of copper and/or lead extracted, it is more preferable to adjust the pH to 2.0 or higher and further preferable to adjust the pH to 3.0 or higher. When the pH is lower than 1.0, copper and/or lead may not be adequately extracted.

The upper limit to the pH is preferably 5.5 or lower and more preferably 5.0 or lower. At above pH 5.5, not only copper and/or lead but also manganese can be extracted.

When the acid solution contains all of copper, lead, and manganese, it is preferable to firstly subject the acid solution to solvent extraction with the pH of the acid solution adjusted to a range of 3.5 or higher to 5.5 or lower to extract copper and lead from the acid solution and subsequently subject the resulting acid solution containing copper and lead and containing little manganese to solvent extraction with the pH of the acid solution adjusted to a range of 1.0 or higher to 3.5 or lower to extract copper from the acid solution. In this way, copper, lead, and manganese can be separated from each other and retrieved with high efficiency.

Case Where Acid Solution is Acid Solution Containing Copper and Nickel

When the acid solution is the acid solution containing copper and nickel, in order to efficiently retrieve copper from the acid solution, any of the amide derivatives above may be used as an extraction agent. As for pH, addition of an organic solution of the extraction agent is preferably performed with the pH of the acid solution adjusted to a range of 1.0 or higher to 2.5 or lower. In order to increase the amount of copper extracted, the lower limit to the pH is more preferably adjusted to 1.5 or higher. In order to suppress nickel extraction, the upper limit to the pH is more preferably adjusted to 2.0 or lower. When the pH is lower than 1.0, copper may not be adequately extracted. At above pH 2.5, not only copper but also nickel can be extracted.

Case Where Acid Solution is Acid Solution Containing Copper and/or Lead and Cobalt When the acid solution is the acid solution containing copper and/or lead and cobalt, in order to efficiently retrieve copper and/or lead from the acid solution, any of the amide derivatives above may be used as an extraction agent. As for pH, addition of an organic solution of the extraction agent is preferably performed with the pH of the acid solution adjusted to a range of 1.0 or higher to 3.5 or lower, and addition of an organic solution of the extraction agent is more preferably performed with the pH of the acid solution adjusted to a range of 2.0 or higher to 3.0 or lower. When the pH is lower than 1.0, copper and/or lead may not be adequately extracted. At above pH 3.5, not only copper and/or lead but also cobalt can be extracted.

The mechanism in which the valuable metal extraction agent containing the amide derivative represented by the general formula (I) above exhibits an extraction behavior different from the extraction behaviors of conventional extraction agents is not accurately grasped. However, it is thought that the structural characteristics of the extraction agent of the present invention give rise to effects that conventional extraction agents do not have.

EXAMPLES

The present invention will now be described in more detail by way of examples. It should be noted, however, that the present invention is not restricted to these descriptions.

Example

Synthesis of Amide Derivatives

As an example of amide derivatives forming an extraction agent, a glycinamide derivative represented by the general formula (I) above was synthesized, that is, N-[N,N-bis(2-ethylhexyl)aminocarbonylmethyl]glycine (or also referred to as N,N-di(2-ethylhexyl)acetamide-2-glycine, hereinafter referred to as "D2EHAG"), into which two 2-ethylhexyl groups were introduced.

D2EHAG was synthesized as follows. First, as shown in the following reaction formula (II), 23.1 g (0.1 mol) of commercially available di(2-ethylhexyl)amine and 10.1 g (0.1 mol) of triethylamine were collected. These were dissolved by adding chloroform, and 13.5 g (0.12 mol) of 2-chloroacetyl chloride was then added by drops thereto, followed by washing with 1 mol/l hydrochloric acid once. After this, washing was carried out with ion exchanged water and the chloroform phase was collected.

Next, anhydrous sodium sulphate was added in a suitable amount (approximately 10 to 20 g) for dehydration, followed by filtration to obtain 29.1 g of yellow liquid. When the structure of this yellow liquid (reaction product) was identified using a nuclear magnetic resonance spectrometer (NMR), the above yellow liquid was confirmed to have the structure of 2-chloro-N,N-di(2-ethylhexyl)acetamide (hereinafter referred to as "CDEHAA"). The percent yield of CDEHAA was 90% relative to di(2-ethylhexyl)amine, a raw material.

(II)

CDEHAA

Next, as shown in the following reaction formula (III), 8.0 g (0.2 mol) of sodium hydroxide was dissolved by adding methanol, and 15.01 g (0.2 mol) of glycine was further added thereto. While stirring the obtained solution, 12.72 g (0.04 mol) of the above CDEHAA was slowly added by drops thereto and stirred. After completion of stirring, the solvent in the reaction liquid was distilled off, and the residue was dissolved by adding chloroform. To this solution, 1 mol/l sulphuric acid was added for acidification, followed by washing with ion exchanged water, and the chloroform phase was collected.

Figure 1:
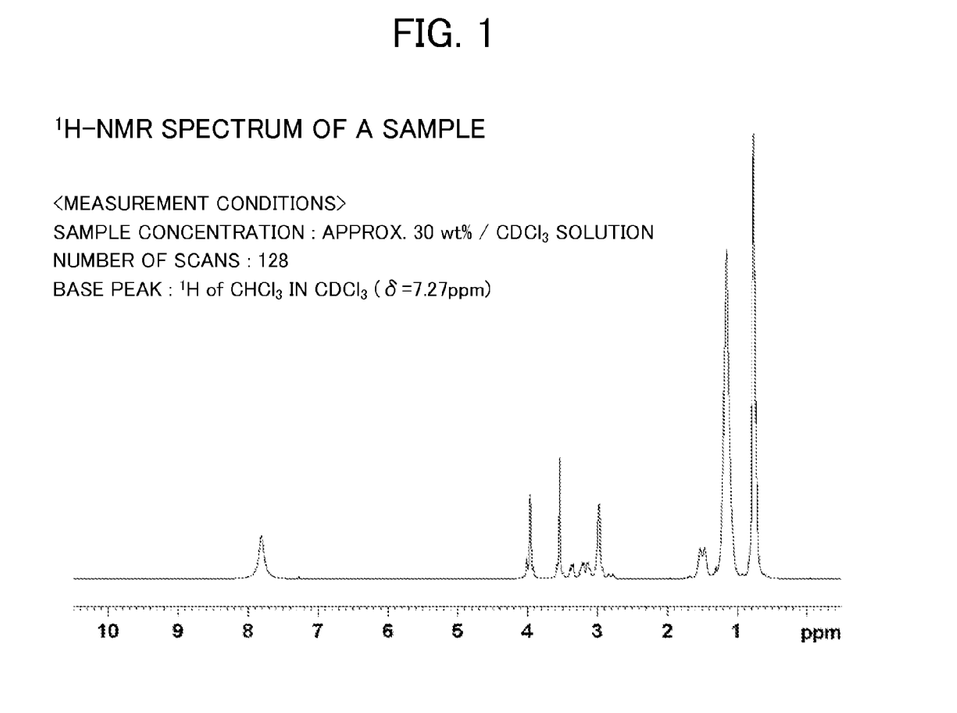
FIG. 1 is figure showing a $^1$H-NMR spectrum of a glycinamide derivative synthesized in the example of the present invention.
Figure 2:
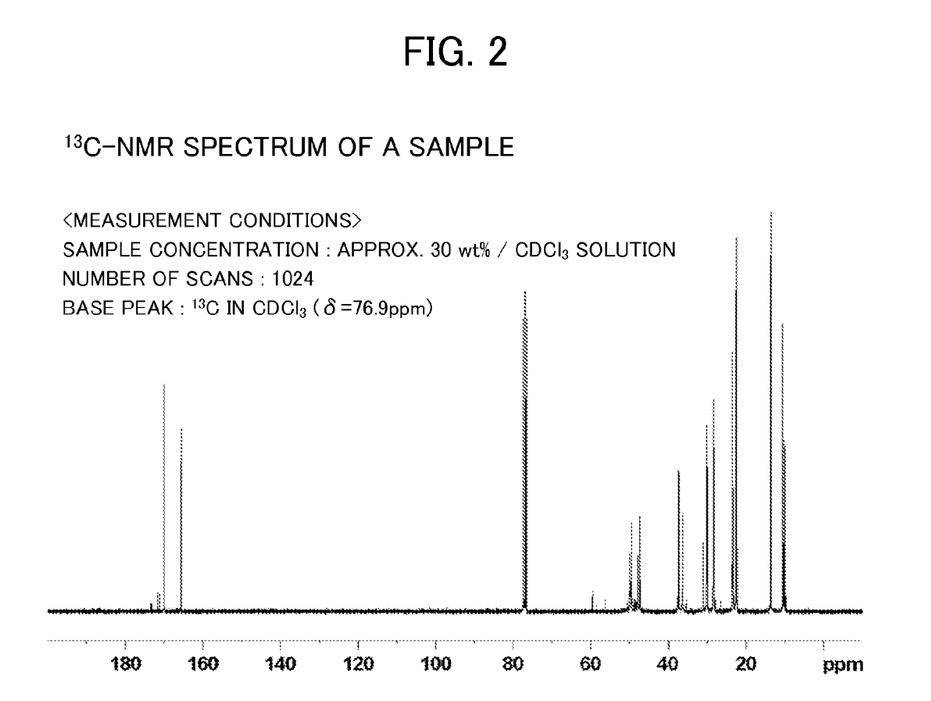
FIG. 2 is figure showing a $^{13}$C-NMR spectrum of a glycinamide derivative synthesized in the example of the present invention.

To this chloroform phase, anhydrous magnesium sulphate was added in a suitable amount for dehydration, followed by filtration. The solvent was removed under reduced pressure again to obtain 12.5 g of yellow paste. The percent yield based on the amount of the above CDEHAA was 87%. When the structure of the yellow paste was identified by NMR and elemental analysis, the paste was confirmed to have the structure of D2EHAG as shown in FIG. 1 and FIG. 2. The above steps were carried out to obtain a valuable metal extraction agent of the example of the present invention.

(III)

D2EHAG

Extraction of Copper and/or Lead

The valuable metal extraction agent of the example of the present invention was used to extract and separate copper and/or lead.

Several types of acid solution of sulphuric acid comprising copper, lead, nickel, cobalt, and manganese each in an amount of $1\times10^{-4}$ mol/l and being adjusted to pH 0.8 to 7.8, and an equal volume of an N-dodecane solution comprising 0.01 mol/l of a valuable metal extraction agent were added together in test tubes, and the test tubes were put into a constant temperature oven at 25° C. and shaken for 24 hours. At this time, the pH of the sulphuric acid solution was adjusted using 0.1 mol/l sulphuric acid, ammonium sulphate and ammonia.

Figure 3:
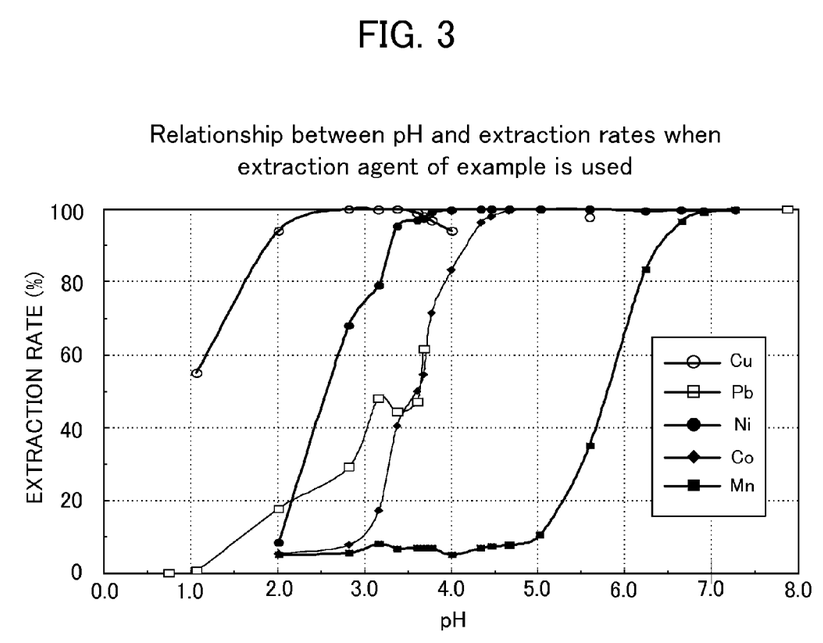
FIG. 3 shows the relationship between the pH of an acid solution containing copper, lead, nickel, cobalt, and manganese and the extraction rates of copper, lead, nickel, cobalt, and manganese when a valuable metal extraction agent of the example of the present invention is used.

After shaking, the aqueous phase was collected, and the cobalt concentration and the manganese concentration were measured using inductively coupled plasma-atomic emission spectroscopy (ICP-AES). The organic phase was subjected to back extraction using 1 mol/l sulphuric acid. The copper concentration, the lead concentration, the nickel concentration, the cobalt concentration, and the manganese concentration in the back extraction phase were measured using ICP-AES. From these measurement results, the extraction rates of copper, lead, nickel, cobalt, and manganese were defined as the amount of material in the organic phase/(the amount of material in the organic phase +the amount of material in the aqueous phase) and measured. The results of the use of the valuable metal extraction agent of the example of the present invention are shown in FIG. 3. In FIG. 3, the abscissa is the pH of an acid solution of sulphuric acid, and the ordinate is the extraction rate (unit: %) of copper, lead, nickel, cobalt, or manganese. In the graphs, white circles indicate the extraction rate of copper, white squares indicate the extraction rate of lead, black circles indicate the extraction rate of nickel, black rhombuses indicate the extraction rate of cobalt, and black squares indicate the extraction rate of manganese.

With the use of the valuable metal extraction agent of the example of the present invention, the extraction rate of copper exceeded 50% at above pH 1.0 and, at above pH 2.0, copper was extracted at an extraction rate higher than 95%. In contrast to this, the extraction rate of nickel was as low as lower than 10% at pH 2 and the extraction rate of cobalt was as low as about 10% even at pH 3.0. Therefore, nickel and cobalt were effectively separated from copper that was extracted at a high extraction rate (FIG. 3). On the other hand, manganese had not achieved an extraction rate of 10% or higher until the pH exceeded 5.0, and therefore was successfully separated from copper nearly perfectly. (FIG. 3).

Regarding lead and nickel, the extraction rate of nickel had been higher than the extraction rate of lead until the pH slightly exceeded 2.1, and, as a result, separation through lead extraction was not successful. Regarding lead and cobalt, at pH 3.3 or lower and preferably at pH 2.8 or lower, most of or about 40% of lead was extracted and about 10% of cobalt was extracted. In this way, lead was extracted preferentially, which allowed successful separation of lead and cobalt from each other. However, at above pH 3.3, the extraction rate of cobalt started to increase rapidly, so that the curve of the extraction rate of cobalt overlapped the curve of the extraction rate of lead and therefore separation failed.

Manganese had not been substantially extracted until the pH exceeded 5.5 as described above, and therefore was successfully separated from lead (FIG. 3). Besides, at a pH within the range of 1.0 or higher to 3.5 or lower and preferably at pH 2.8 or lower, the extraction rate of copper was 55% or higher while the extraction rate of lead was as low as lower than 50%, which made it possible to separate copper and lead from each other. (FIG. 3)

The extraction properties of the extraction agent of the present invention can be used to develop a viable multi-step method of, for example, extracting all at once copper, lead, nickel, and cobalt, except for manganese, contained in an acid solution and then selectively extracting cobalt, nickel, and copper in this order by, for example, re-adjusting the pH to achieve separation of each component.

The invention claimed is:

1. A valuable metal extraction method, the method comprising subjecting an acid solution containing a valuable metal and manganese to solvent extraction with a valuable metal extraction agent that comprises an amide derivative represented by the following general formula (I):

(I)

wherein, $R^1$ and $R^2$ each represent the same or different alkyl groups;
the alkyl group can be a straight chain or a branched chain;
$R^3$ represents a hydrogen atom or an alkyl group; and
$R^4$ represents a hydrogen atom or any group other than an amino group, which is bound to the α carbon as an amino acid
to extract the valuable metal from the acid solution,
wherein the valuable metal is copper, lead, or a combination thereof.

2. The valuable metal extraction method according to claim 1, wherein the amide derivative is selected from the group consisting of glycinamide derivatives, histidinamide derivatives, lysinamide derivatives, aspartamide derivatives, and N-methylglycine derivatives.

3. The valuable metal extraction method according to claim 2, wherein the acid solution is subjected to the solvent extraction with the pH of the acid solution adjusted to a range of 5.5 or lower.

4. The valuable metal extraction method according to claim 2, wherein the acid solution is subjected to the solvent extraction with the pH of the acid solution adjusted to 1.0 or higher.

5. The valuable metal extraction method according to claim 2, wherein
the acid solution contains copper, lead, and cobalt,
the acid solution is subjected to the solvent extraction with the pH of the acid solution adjusted to a range of 3.5 or higher to 5.5 or lower to extract the copper and the lead from the acid solution, and
subsequently the acid solution is subjected to the solvent extraction with the pH of the acid solution adjusted to a range of 1.0 or higher to 3.5 or lower to extract the copper from the acid solution.

6. The valuable metal extraction method according to claim 1, wherein the acid solution is subjected to the solvent extraction with the pH of the acid solution adjusted to 1.0 or higher.

7. The valuable metal extraction method according to claim 1, wherein the amide derivative is any one or more of glycinamide derivatives, histidinamide derivatives, lysinamide derivatives, aspartamide derivatives, and N-methylglycine derivatives; and wherein the acid solution is subjected to the solvent extraction with the pH of the acid solution adjusted to a range of 5.5 or lower.

8. A valuable metal extraction method, the method comprising subjecting an acid solution containing copper and nickel to solvent extraction with a valuable metal extraction agent that comprises an amide derivative represented by the following general formula (I):

(I)

wherein, $R^1$ and $R^2$ each represent the same or different alkyl groups;
the alkyl group can be a straight chain or a branched chain;
$R^3$ represents a hydrogen atom or an alkyl group; and
$R^4$ represents a hydrogen atom or any group other than an amino group, which is bound to the α carbon as an amino acid
to extract the copper from the acid solution.

9. The valuable metal extraction method according to claim 8, wherein the acid solution is subjected to the solvent extraction with the pH of the acid solution adjusted to 1.0 or higher to 2.5 or lower.

10. A valuable metal extraction method, the method comprising subjecting an acid solution containing a valuable metal and cobalt to solvent extraction with a valuable metal extraction agent that comprises an amide derivative represented by the following general formula (I):

wherein, $R^1$ and $R^2$ each represent the same or different alkyl groups;
the alkyl group can be a straight chain or a branched chain;
$R^3$ represents a hydrogen atom or an alkyl group; and
$R^4$ represents a hydrogen atom or any group other than an amino group, which is bound to the α carbon as an amino acid
to extract the valuable metal from the acid solution,
wherein the valuable metal is copper, lead, or a combination thereof.

11. The valuable metal extraction method according to claim 10, wherein the acid solution contains copper and cobalt, and the acid solution is subjected to the solvent extraction with the pH of the acid solution adjusted to 1.0 or higher to 3.5 or lower.

12. The valuable metal extraction method according to claim 10, wherein the acid solution contains lead and cobalt, and the acid solution is subjected to the solvent extraction with the pH of the acid solution adjusted to 1.0 or higher to 3.3 or lower.

* * * * *